US012631908B2

(12) United States Patent
Michels et al.

(10) Patent No.: US 12,631,908 B2
(45) Date of Patent: May 19, 2026

(54) MEASUREMENT SYSTEM FOR MEASURING A POSITION OF AN EYEBOX OF A VIRTUAL IMAGE AND METHOD FOR MEASURING A POSITION OF AN EYEBOX OF A VIRTUAL IMAGE

(71) Applicant: tooz technologies GmbH, Aalen (DE)

(72) Inventors: Georg Michels, Aalen (DE);
Frank-Oliver Karutz, Blaustein (DE);
Michael Pollmann, Koenigsbronn (DE)

(73) Assignee: tooz technologies GmbH, Aalen (DE)

( * ) Notice: Subject to any disclaimer, the term of this patent is extended or adjusted under 35 U.S.C. 154(b) by 412 days.

(21) Appl. No.: 18/485,280

(22) Filed: Oct. 11, 2023

(65) Prior Publication Data

US 2024/0126105 A1    Apr. 18, 2024

(30) Foreign Application Priority Data

Oct. 12, 2022    (DE) .......................... 102022126624.9

(51) Int. Cl.
*G02C 13/00* (2006.01)
*G01M 11/02* (2006.01)

(52) U.S. Cl.
CPC ....... *G02C 13/003* (2013.01); *G01M 11/0207* (2013.01); *G01M 11/0214* (2013.01)

(58) Field of Classification Search
CPC .... G02B 2027/0138; G02B 2027/0187; G02B 2027/0198; G02B 2027/0129; G02B 2027/0118; G02B 7/12; G01M 11/0207; G01M 11/0214; G01M 11/0257; G01M 11/0264; G02C 13/003
See application file for complete search history.

(56) References Cited

U.S. PATENT DOCUMENTS 4,991,305 A * 2/1991 Saigo ...................... B24B 9/144
33/28
7,090,348 B2 * 8/2006 Nason .................... G02C 7/061
351/205
9,116,337 B1 * 8/2015 Miao ........................ G02B 3/14
9,829,707 B2 * 11/2017 Border .................... G09G 3/002
10,114,235 B2 * 10/2018 Blum ..................... G02C 11/10
11,126,015 B2 * 9/2021 Gueu ................. G01M 11/0214
(Continued)

FOREIGN PATENT DOCUMENTS

CN        107884160 A * 4/2018 ............ G01M 11/00
CN        108204889 A * 6/2018 ............ G01M 11/00
(Continued)

*Primary Examiner* — Gordon J Stock, Jr.
(74) *Attorney, Agent, or Firm* — Skaar Ulbrich Macari, P.A.

(57) ABSTRACT

A measurement system for measuring a position of an eyebox of a virtual image of a pair of spectacles that can be worn on the head of a user can include a holding device for holding the spectacles at a predefined position, and a projection area element, onto which light beams that generate a virtual image can be projected via the first spectacle lens when the spectacles are held by the holding device. The projection area element is arranged at such a position in relation to the first spectacle lens that when the spectacles are held by the holding device, the position of the projection area element at least partially corresponds to the position of a pupil of the user when the user wears the spectacles on the head.

20 Claims, 5 Drawing Sheets

(56)                References Cited

U.S. PATENT DOCUMENTS

| | | | | |
|---|---|---|---|---|
| 12,360,354 B2 * | 7/2025 | Szapiel | ............... | G02B 25/001 |
| 2002/0085196 A1 * | 7/2002 | Fukuma | ............ | G01M 11/0207 |
| | | | | 356/124 |
| 2002/0113940 A1 * | 8/2002 | Fukuma | ............ | G06Q 30/0621 |
| | | | | 351/200 |
| 2004/0117011 A1 * | 6/2004 | Aharoni | ................... | A61F 2/14 |
| | | | | 623/4.1 |
| 2010/0149073 A1 * | 6/2010 | Chaum | ............. | G02B 27/0075 |
| | | | | 345/8 |
| 2014/0104685 A1 * | 4/2014 | Bohn | .................... | G02B 30/36 |
| | | | | 359/473 |
| 2017/0205630 A1 * | 7/2017 | Tremblay | ........... | G02B 27/0103 |
| 2020/0033595 A1 * | 1/2020 | Stegelmeier | ....... | G02B 27/0081 |
| 2024/0310626 A1 * | 9/2024 | Pan | ................... | G02B 27/0093 |
| 2025/0274574 A1 * | 8/2025 | Sun | ................... | G01M 11/0264 |

FOREIGN PATENT DOCUMENTS

| | | | | | | |
|---|---|---|---|---|---|---|
| CN | 207964249 | U | | 10/2018 | | |
| CN | 108267299 | B | * | 12/2019 | ........ | G01M 11/0207 |
| CN | 110967166 | A | * | 4/2020 | ............ | G01M 11/00 |
| CN | 109387131 | B | * | 9/2020 | ............ | G01B 11/02 |
| CN | 109741294 | B | | 11/2021 | | |
| CN | 111678674 | B | * | 8/2022 | ........ | G01M 11/0264 |
| CN | 113125114 | B | * | 5/2023 | ........ | G01M 11/0242 |
| DE | 4131331 | A1 | | 4/1993 | | |
| DE | 102012010120 | A1 | | 11/2013 | | |
| JP | 2007289683 | A | * | 11/2007 | ........... | G02C 13/005 |
| WO | 2015158827 | A1 | | 10/2015 | | |
| WO | 2015158832 | A1 | | 10/2015 | | |

* cited by examiner

MEASUREMENT SYSTEM FOR MEASURING A POSITION OF AN EYEBOX OF A VIRTUAL IMAGE AND METHOD FOR MEASURING A POSITION OF AN EYEBOX OF A VIRTUAL IMAGE

PRIORITY

This application claims priority to German patent application 10 2022 126 624.9 filed 12 Oct. 2022, the entire content of which is incorporated herein by reference.

FIELD

The invention relates to a measurement system for measuring a position of an eyebox of a virtual image and to a method for measuring a position of an eyebox of a virtual image.

BACKGROUND

In the case of spectacles which create a virtual image, it is often difficult to check whether the user of the spectacles can see the virtual image clearly and sharply. This is difficult in particular in the case of spectacles into a lens of which the light of the virtual image or the light beams that generate the virtual image is/are input coupled and in the case of which the light is output coupled out of the spectacle lens again through an output coupling region (for example a Fresnel structure). Owing to the spectacle frame, or the mount, and forces exerted on it, for example because the user has a wide head (so that the spectacle sidepieces are pressed away from one another), the position of the eyebox can shift, with the result that the light beams that generate the virtual image are incident at a different position of the eye of the viewer than is intended, or are incident only partially or not at all. The range of the pupil distances covered by the illuminated region or by the eyebox changes. That is to say, under certain circumstances the virtual image is no longer completely visible and/or can no longer be seen sharply by the user.

SUMMARY

An object herein is to provide a measurement system for measuring a position of an eyebox of a virtual image and a method for measuring a position of an eyebox of a virtual image, in the case of which device and method the position of the eyebox of a virtual image can be detected or checked quickly and in technically straightforward fashion. In particular, this should be possible without placing the spectacles on the head of a human.

In particular, the object is achieved in certain embodiment by a measurement system for measuring a position of an eyebox of a virtual image of a pair of spectacles that can be worn on the head of a user, the spectacles comprising a projector for generating the virtual image, which can be projected through the pupil onto the retina of a wearer of the spectacles via a first spectacle lens of the spectacles when the user wears the spectacles on the head, the measurement system comprising the following: a holding device for holding the spectacles at a predefined position, a projection area element, onto which the light beams that generate the virtual image can be projected via the first spectacle lens when the spectacles are held by the holding device, the projection area element being arranged at such a position in relation to the first spectacle lens, when the spectacles are held by the holding device, that the position of the projection area element at least partially corresponds to the position of a pupil of the user when the user wears the spectacles on the head.

An advantage of this is that the position of the eyebox of a virtual image can be checked in technically straightforward fashion. In particular, it can easily be checked whether the eyebox is at a position where the pupil of the wearer of the spectacles is when the spectacles are worn by a wearer as intended on the head, that is to say on the eyes and the nose. In particular, it can be checked whether the eyebox is at such a position that, when the spectacles are being worn on the head of a user, a pupil of the user is within the eyebox, or completely within the eyebox. This position may depend on the respective wearer, that is to say it can be checked in each case for a specific person (individually) whether the position of the eyebox of the virtual image is correct or not. It is also conceivable that the predefined position where the eyebox of the virtual image is to be located (intended position) is independent of a wearer. Consequently, it is possible to use the measurement system, after the spectacles have been produced, to check whether the eyebox of the virtual image is at the intended position, or it can be checked how large a possible deviation between an actual position or real position of the eyebox of the virtual image and the intended position is. The projection area element or at least part of it is at the position where the pupil of an eye of the wearer of the spectacles or part of the pupil of the eye of the wearer of the spectacles is. If there is a deviation between the actual position and the intended position, it can be correspondingly corrected. It is conceivable that the spectacles comprise corresponding correction options or modification options (for example, adjusting screws), which can be used to change the position of the eyebox of the virtual image on the projection area element. For example, the spectacles may be a pair of spectacles as described in DE 10 2014 207 488 A1 and DE 10 2014 207 497 A1. This means that the face form angle of the first spectacle lens and/or of the second spectacle lens of the spectacles and/or the pantoscopic angle of the first and/or of the second spectacle lens relative to the projector and/or an angle between the first spectacle sidepiece and the first spectacle lens and/or an angle between the second spectacle sidepiece and the first or second spectacle lens and/or a distance between the first spectacle lens and the second spectacle lens of the spectacles can be changed by means of setting devices of the spectacles (for example adjusting screws). The spectacles may comprise a first spectacle sidepiece and a second spectacle sidepiece for mounting the spectacles on the ears or auricles of the user.

In particular, the object is achieved in certain example embodiments by a method for measuring a position of an eyebox of a virtual image of a pair of spectacles with a first spectacle lens that can be worn on the head of a user, in particular by means of a measurement system as described above, the method comprising the following steps: providing the spectacles; arranging a projection area element on a first side of the first spectacle lens, the projection area element having a first predefined distance from the first side of the first spectacle lens, the projection area element being arranged at a position in relation to the first spectacle lens that at least partially corresponds to the position of a pupil of the user when the user wears the spectacles on the head; projecting the light beams that generate the virtual image onto the projection area element via the first spectacle lens; detecting the position of the eyebox of the virtual image on the projection area element.

An advantage of this is that the position of the eye box of the virtual image can be detected in technically straightforward fashion. In addition, the method makes it possible to adapt the spectacles individually to a person in such a way that the virtual image is clearly visible and sharp for the wearer when they wear the spectacles on the ears and nose. Usually, for this the wearer must stop the eyes looking straight ahead and look at the first spectacle sidepiece. The spectacles measured for this method may be a pair of spectacles as described in DE 10 2014 207 488 A1 and DE 10 2014 207 497 A1.

The holding device in certain embodiments comprises a spectacle sidepiece holding device for holding a first spectacle sidepiece and/or a second spectacle sidepiece of the spectacles at a predefined position. In this way, the spectacles can be held particularly securely and in the same way as when they are worn by a wearer on the head.

According to an example embodiment of the measurement system, the measurement system furthermore comprises a nosepiece holding device for holding the nosepiece of the spectacles at a predefined position. An advantage of this is that the spectacles can be held particularly securely in the measurement system. In addition, when there is a spectacle sidepiece holding device, the three-point mounting in the measurement system substantially corresponds to the mounting of the spectacles when they are worn by a human, specifically on the two ears and on the nose.

According to an example embodiment of the measurement system, the measurement system furthermore comprises a first moving device for changing the angle between a first spectacle sidepiece of the spectacles and the first spectacle lens. This makes it possible to move the first spectacle sidepiece selectively and precisely in relation to the first spectacle lens. Therefore, the angle between the first spectacle sidepiece and the first spectacle lens can be changed in technically straightforward fashion. In this way, the position of the eyebox of the virtual image on the projection area element can be changed easily, analogously to the position on the/in the eye of the wearer of the spectacles. In particular, it is possible to change the position of the eyebox of the virtual image in the x direction. In addition, the distance between the first spectacle sidepiece and the second spectacle sidepiece can be changed in technically straightforward fashion. This makes it possible to adapt the spectacles to the head width of the wearer or potential wearer. Moreover, different spectacles or spectacle frames or spectacle mounts or spectacle lenses can be examined in terms of their stiffness. In particular, it is possible to examine the extent to which moving the first spectacle sidepiece affects the position of the eyebox and thus indirectly the position of the virtual image. That is to say, it is possible to observe the extent to which the position of the eyebox of the virtual image or the projection of the light beams, forming the virtual image, on the projection area element changes depending on the position of the first spectacle sidepiece or the angle between the first spectacle sidepiece and the first spectacle lens. In this way, it is possible to examine different materials or spectacle frames. Individual adaptation of the spectacles to the wearer is also possible.

According to an example embodiment of the measurement system, the measurement system furthermore comprises a second moving device for changing the angle between a second spectacle sidepiece of the spectacles and the first spectacle lens. This makes it possible to move the second spectacle sidepiece, which is further away from the first spectacle lens than the first spectacle sidepiece is, relative to the first spectacle lens in technically straightforward fashion.

According to one embodiment of the measurement system, the first moving device and the second moving device are designed such that the angle between the first spectacle sidepiece and the first spectacle lens can be changed substantially independently of the angle between the second spectacle sidepiece and the first spectacle lens. This makes it possible to more precisely examine the change in the eyebox of the projected virtual image on the projection area element independently of the position or the angle of the first spectacle sidepiece and the second spectacle sidepiece relative to the first spectacle lens.

According to an example embodiment of the measurement system, the first moving device and/or the second moving device comprises a force measurement system for measuring the force exerted by the first spectacle sidepiece or the second spectacle sidepiece on the first moving device or the second moving device, respectively. An advantage of this is that inadvertent bending of or inadvertent damage to the first spectacle sidepiece and/or to the second spectacle sidepiece can be reliably prevented. In addition, the forces that arise and the changes to the position of the eyebox of the virtual image that they cause can be established.

According to an example embodiment of the measurement system, the measurement system is designed—to detect the intensity distribution and/or the irradiance and/or the illuminance of the light beams that generate the virtual image and/or—to detect the intensity distribution and/or the irradiance and/or the illuminance on the projection area element. This makes it possible to measure the position of the eyebox in precise and detailed fashion. In particular, it is also possible to determine the brightness of the virtual image. The periphery of the eyebox or the size of the eyebox can, for example, be determined as the location where the brightness falls below a predetermined value (for example 80%) of the maximum brightness. The maximum brightness may be measured in the center of the eyebox, or the brightness value at this location may correspond to 100% brightness. It is also possible that the measurement system is designed to detect the distribution of the irradiance and/or the illuminance.

According to an example embodiment of the measurement system, the projection area element is at least partly, in particular completely, partially transparent. An advantage of this is that the position of the eyebox on the projection area element can be easily detected from the rear side, that is to say from that side of the projection area element that faces away from the first spectacle lens. Therefore, the position of the eyebox of the virtual image or the region illuminated by the light beams that form the virtual image can be determined with particular precision. Looking through the first spectacle lens to establish the position of the eyebox of the virtual image on the projection area element can be distorted by an output coupling structure of the spectacle lens for output coupling the light out of the first spectacle lens, for example a Fresnel structure, or is possibly less precise. To determine the eyebox position by evaluating the illuminated surface of the projection area element, it is advantageously possible to use a camera, which detects, and optionally permanently stores in memory or archives, an image of the projection area element for further processing by means of corresponding evaluation algorithms or evaluation software (in this respect, cf. also the next paragraph).

According to an example embodiment of the measurement system, the projection area element comprises a light sensor element, in particular a camera. An advantage of this is that the position of the eyebox of the virtual image, for example including the intensity distribution inside the eyebox, on the projection area element can be directly automated or mechanically detected. Moreover, the position can be detected extremely precisely. The light sensor element may comprise multiple light sensors, for example an array of light sensors. It is conceivable that the light sensor element, or the camera, is connected to a computer or a controller which detects the position of the eyebox of the virtual image on the projection area element in automated fashion; in this respect, a comparison can be made between the detected position and an intended position of the eyebox of the virtual image on the projection area element. It is also possible to detect changes in the position of the eyebox of the virtual image when forces are acting on the spectacles and/or changes to the shape of the spectacles.

According to an example embodiment of the measurement system, the measurement system is designed such that the distance between the projection area element and the first spectacle lens, when the spectacles are held by the holding device, can be changed, in particular can be changed such that the distance between the projection area element and the first spectacle lens can be set to a predefined value. An advantage of this is that the distance between the first spectacle lens, or the smallest distance between the first spectacle lens, and the projection area element can be adapted to the (individual) distance between the corneal vertex of the user and the first spectacle lens in technically straightforward fashion. Therefore, the projection area element is at the same distance from the first spectacle lens as the pupil is, with the result that the projection area element is also at the position of the pupil of the wearer in the y direction when the wearer (later) wears the spectacles on the head.

According to an example embodiment of the measurement system, the measurement system comprises an angle measuring apparatus for detecting the face form angle of the first spectacle lens. An advantage of this is that it makes it possible to detect a further property of the spectacles that can affect the position of the virtual image.

According to an example embodiment of the measurement system, the measurement system comprises a setting device, the setting device being designed—to detect the position of the eyebox of the virtual image on the projection area element, —to compare the detected position of the eyebox of the virtual image on the projection area element with an intended position, and—to change—a face form angle of the first spectacle lens and/or of a second spectacle lens of the spectacles and/or—a pantoscopic angle of the first spectacle lens relative to the projector and/or—an angle between the first spectacle sidepiece and the first spectacle lens and/or an angle between the second spectacle sidepiece and the first and/or second spectacle lens and/or—a distance between the first spectacle lens and the second spectacle lens. An advantage of this is that the position of the eyebox of the virtual image can be changed in technically straightforward fashion. Moreover, it is possible to correct or change the position of the eyebox of the virtual image in automated fashion when the setting device is connected to a computer or a controller. Furthermore, a multiplicity of measurements can be taken automatically and/or in automated fashion in order to examine different spectacles or mounts in terms of the change in the position of the eyebox of the virtual image depending on properties of the spectacles (material of the spectacles, position of the spectacle sidepieces, face form angle etc.) and/or forces that act on the spectacles.

According to an example embodiment of the method, the method furthermore comprises the following step: comparing the detected position with an intended position of the eyebox of the virtual image on the projection area element. An advantage of this is that the actual position can be compared with the intended position quickly and in technically straightforward fashion. The method makes it possible to check the spectacles, for example after production, as to whether they meet prescribed quality standards in terms of the position of the eyebox of the virtual image or in terms of the change in the eyebox of the virtual image when forces arise.

According to an example embodiment of the method, the spectacles also comprise a second spectacle lens, a face form angle of the first spectacle lens and/or of the second spectacle lens being changed in order to change the position of the eyebox of the virtual image on the projection area element. An advantage of this is that, as a result, the position, in particular the x position, of the virtual image on the projection area element can be changed in technically straightforward fashion.

According to an example embodiment of the method, a pantoscopic angle of the first spectacle lens relative to the projector and/or relative to the spectacle sidepiece is changed in order to change the position of the eyebox of the virtual image on the projection area element. An advantage of this is that the y position, or height, of the eyebox of the virtual image can be adapted and/or set particularly quickly.

According to an example embodiment of the method, the force exerted by a first spectacle sidepiece and/or by a second spectacle sidepiece of the spectacles on a first moving device to change the angle between the first spectacle sidepiece and the first spectacle lens or on a second moving device to change the angle between the second spectacle sidepiece and the first spectacle lens is detected. An advantage of this method is that, for the one part, undesired damage to or deformation of the spectacle sidepieces is prevented, and, for the other part, it is possible to precisely examine what forces arise that cause what change in the position of the eyebox of the virtual image on the projection area element.

According to an example embodiment of the method, the intensity distribution and/or the irradiance and/or the illuminance of the light beams that generate the virtual image and/or the intensity distribution and/or the irradiance and/or the illuminance on the projection area element are/is detected. This method makes it possible to measure the eyebox, or the eyebox of a virtual image, precisely and in detail.

The term "eyebox", or "eyebox of a virtual image", can be understood in particular to mean a (cross-sectional) area which is illuminated in the plane of the pupil by the light beams that generate the virtual image when the user wears the spectacles on the head, and inside which the entire pupil of the viewer should ideally be located in order to be able to (completely) perceive the imaging of the virtual image produced on the cornea after passage through the pupil and crystalline lens. If the pupil is located only partially inside the eyebox, vignetting and/or image trimming can arise, that is to say that the virtual image is not completely visible to the user. The "eyebox of a virtual image" can therefore be the region or the area which, when the user wears the spectacles on the head, is illuminated by the light beams that generate the virtual image, in such a way that the complete virtual image can be perceived or seen by the user by means of the eye.

The boundary of the "eyebox" may be in particular be the location where the light intensity of the light beams that generate the virtual image drops below a predetermined value and/or where a predetermined vignetting of the virtual image occurs. It is also conceivable that the boundary of the "eyebox" may in particular be the location where the virtual image that is generated and incident on the retina of the user through the pupil is trimmed, that is to say is not completely visible. In this respect, it can be taken into account that the diameter of the pupil of the eye can change, for example depending on the ambient light and/or the age of the user. Usually, a diameter of the pupil of the eye of approximately 3.0 mm can be assumed. The diameter of the pupil of the eye can theoretically fluctuate between approximately 1.5 mm and approximately 8.0 mm.

The expression "virtual image" can be understood in particular to mean the image from the projector that is projected onto the retina, or cornea, of the wearer of the spectacles through the pupil and the crystalline lens, or that the wearer of the spectacles sees owing to the projector. The area illuminated by the projector or the illuminated region on the projection area element of the measurement system may in particular be referred to as "eyebox of the virtual image". The projection area element of course represents the pupil of the wearer. At the location of the projection area element, the result is still no sharp imaging from the projector, or of the image displayed by the projector, but only an area illuminated by the multiplicity of light beams that generate the virtual image but are still unfocused at this location. The virtual image on the projection area element is not a real imaging of the virtual image.

The term "projector" can be understood in particular to mean a device, for example a display, in particular for example an LED or OLED display, which emits or shines light beams. The projector casts light beams indirectly, specifically by means of the first spectacle lens, through the pupil onto the retina of the wearer of the spectacles, or in the measurement system onto the projection area element. In this respect, the light from the projector can be input coupled or radiated into the spectacle lens and be output coupled out of the first spectacle lens, or exit the spectacle lens, again by means of an output coupling structure, for example a Fresnel structure of the first spectacle lens. However, it is also conceivable that the light or the light beams from the projector are radiated onto a first side of the first spectacle lens and in the process the light beams are at least partially reflected in such a way that the light beams land in the pupil of the wearer when the wearer wears the spectacles as intended.

The term "project" can be understood in particular to mean that light beams are radiated onto a specific region in order to generate an image. The region may for example be the projection area element and/or a side of the projection area element or the eye and/or the retina. This can be effected in particular indirectly, that is to say that the light beams are deflected and/or reflected once or multiple times during the projection operation. As a result, the light beams from the projector can be input coupled into the first spectacle lens and, after being output coupled, are lastly radiated, i.e. projected, onto the projection area element or the eye and/or the retina.

The term "wear on the head" can be understood in particular to mean that a human wears the spectacles on both ears or auricles and on the nose, the spectacle sidepieces being borne by the ears or auricles while the nose supports the nosepiece.

The intensity, or the distribution of the intensity, of the light beams that generate the image can be detected on the projection area element. The intensity may be the illuminance, for example measured in lux, that is to say lumen/m².

It is also conceivable that the intensity of the light beams is detected directly, for example measured in candela units, that is to say 1 lumen per steradian.

The invention will be explained in even more detail hereinafter on the basis of exemplary embodiments, with reference being made to the attached drawings which likewise disclose features essential to the invention. These exemplary embodiments only serve illustrative purposes and should not be construed as limiting. By way of example, a description of one exemplary embodiment comprising a multiplicity of elements or components should not be construed as meaning that all of these elements or components are required for implementation purposes. Rather, other exemplary embodiments may also contain alternative elements and components, fewer elements or components, or additional elements or components. Elements or components of different exemplary embodiments can be combined with one another provided nothing else is specified. Modifications and variations described for one of the exemplary embodiments may also be applicable to other exemplary embodiments. To avoid repetition, similar or corresponding elements are denoted by the same reference sign throughout the figures and are not explained multiple times.

DETAILED DESCRIPTION

The same reference signs are used in the following description for parts that are the same and parts that act in the same way.

Figure 1:
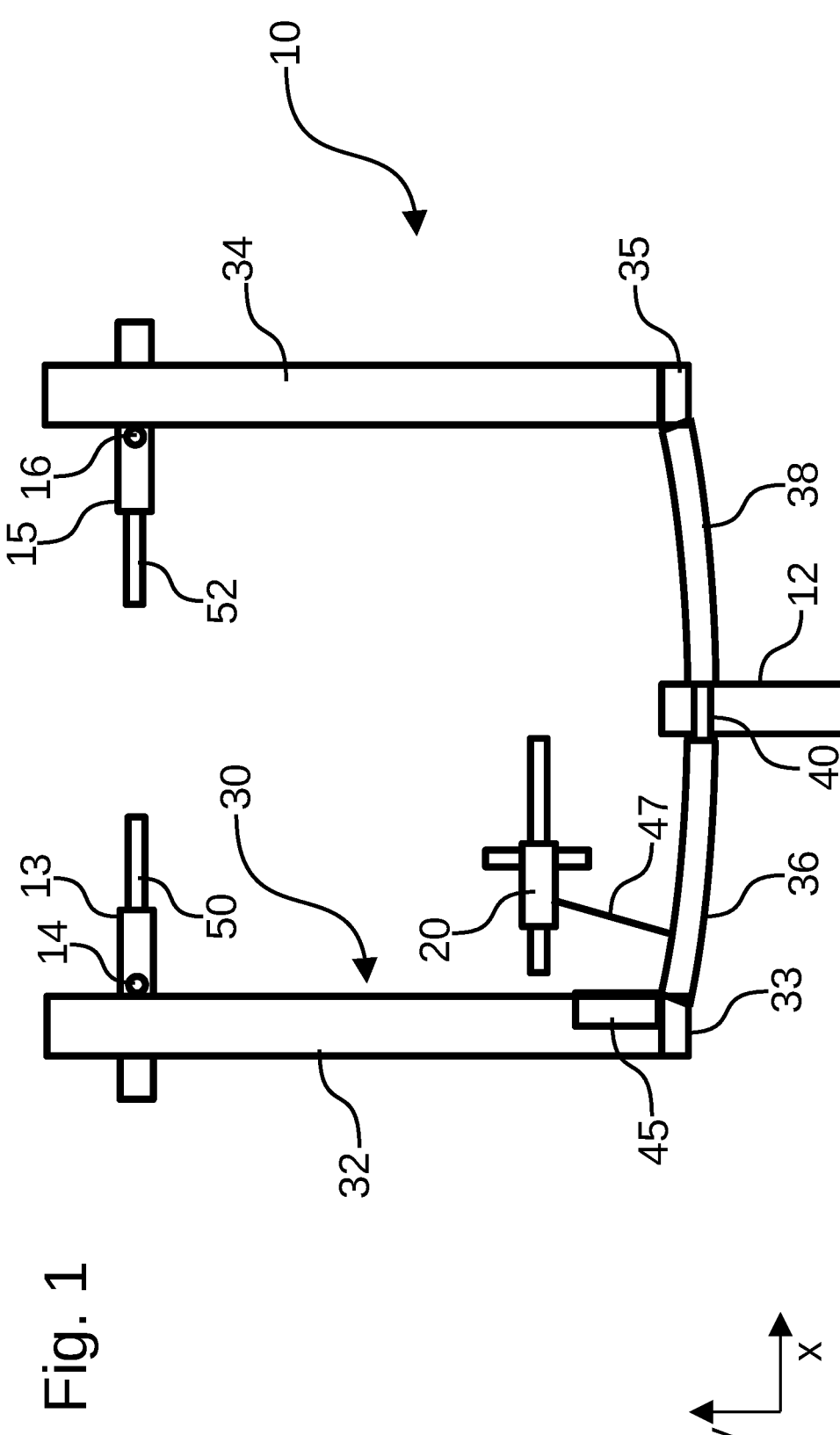
FIG. 1 shows a schematic plan view of a first embodiment of the measurement system in accordance with embodiments of the invention.
Figure 2:
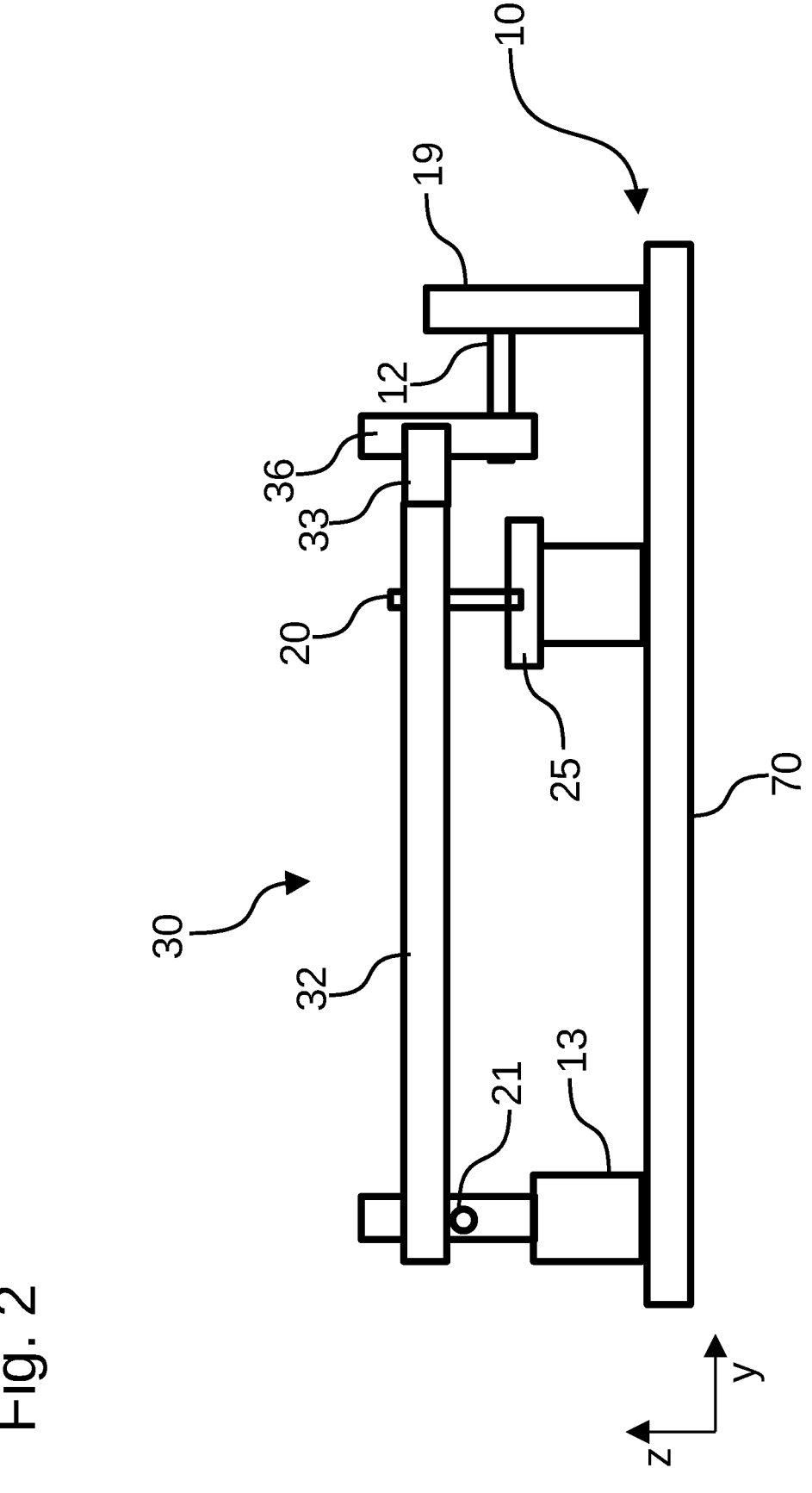
FIG. 2 shows a schematic side view of the measurement system from FIG. 1.

FIG. 1 shows a schematic plan view of a first embodiment of the measurement system 10. FIG. 2 shows a schematic side view of the measurement system 10 from FIG. 1.

The measurement system 10 is designed to measure the position of an eyebox of a virtual image of a pair of spectacles 30. To that end, the spectacles 30, which generate or are intended to generate a virtual image in the eye of the wearer, are placed on the measurement system 10 or arranged or held on the measurement system 10. At the location where the pupil or part of the pupil of the wearer is usually located when the wearer wears the spectacles 30 as intended, there is a projection area element 20. The eyebox of the virtual image, which then can be seen as actually illuminated area but not as a sharp imaging of the image, is projected on this projection area element 20.

The virtual image can comprise image data and/or data. The eye box of the virtual image that is visible on the projection area element 20 can be used as starting point to determine the position of a pure white image. However, it is conceivable that an actual image (for example a test image) is used.

The measurement system 10 comprises a holding device for holding the spectacles 30. The holding device may be a spectacle sidepiece holding device. The spectacle sidepiece holding device is designed to hold the first spectacle sidepiece 32 and the second spectacle sidepiece 34 of the spectacles 30. The spectacle sidepiece holding device comprises a first sidepiece carrier 13 and a second sidepiece carrier 15. A first sidepiece carrier 13 of the measurement system 10 holds the first spectacle sidepiece 32. A second sidepiece carrier 15 of the measurement system 10 holds the second spectacle sidepiece 34. It is conceivable that the spectacle sidepieces 32, 34 each rest on the spectacle carriers 13, 15. The holding can be carried out in particular in a region of the respective spectacle sidepiece 32, 34 that faces away or is remote from the first spectacle lens 36.

The measurement system 10 may comprise a base plate 70 on which the elements of the measurement system 10 are arranged.

The spectacles 30 usually have a first spectacle lens 36 and a second spectacle lens 38, which are held by a mount.

The mount has been substantially omitted, or not illustrated, in the drawings. The spectacle sidepieces 32, 34 are connected to the first spectacle lens 36 and to the second spectacle lens 38, or to the mount, via a first spectacle hinge 33 and a second spectacle hinge 35, respectively. The spectacle sidepieces 32, 34 may thus be folded together. However, it is also conceivable that the spectacle sidepieces 32, 34 are rigid, that is to say cannot be folded together.

The spectacles 30 have a first projector 45, or a display. The projector 45, or the display, can be arranged or fastened in the first spectacle sidepiece 32, or arranged on or fastened to the first spectacle sidepiece 32. Light beams 47 generated by the projector 45, or display, generate a virtual image for the wearer of the spectacles 30, or a virtual image at a focusable distance for the wearer of the spectacles, the light beams that generate the virtual image illuminating a specific region on the projection area element 20 in the measurement system 10. The light beams 47 may be input coupled into the first spectacle lens 36 of the spectacles 30. The first spectacle lens 36 may have an input coupling portion which is partially in the first spectacle hinge 33. Here, the light can be reflected (at least partially) back and forth multiple times between the front side and the rear side of the first spectacle lens 36, before the light, or the light beams 47, exit the first spectacle lens 36 through an output coupling structure and are incident on the pupil of the viewer or the projection area element 20. The output coupling structure may comprise a Fresnel structure.

The measurement system 10 has a projection area element 20. The projection area element 20 is movable in a horizontal plane. This means that the distance between the projection area element 20 and the first spectacle lens 36 can be changed. Moreover, the lateral position, that is to say the distance from the first spectacle sidepiece 32 or from the first sidepiece carrier 13, can be changed.

The projection area element 20 may have a flat or planar form. It is also conceivable that the projection area element 20 is partially curved or has a curvature. The curvature of the projection area element 20 may correspond to the curvature of a human eye. The projection area element may be aligned substantially parallel to the x axis. The projection area element 20 may for example be a diffusing plate and/or a cardboard element or an element comprising cardboard and/or plastic or an element made of cardboard and/or plastic. The projection area element 20 may comprise or be a light sensor or multiple light sensors and/or comprise or be a light detector or multiple light detectors.

The projection area element 20 constitutes the position of the pupil or the projection area element 20 is arranged at a location which at least partially corresponds to the position of the pupil of the wearer of the spectacles 30 when the spectacles 30 are worn as intended (on the nose and both auricles). The projection area element 20 makes it possible to establish the pupil position or pupil positions at which the virtual image is visible for the user (what is referred to as the eyebox). It can similarly be established whether the complete virtual image, or what brightness of the virtual image, can be perceived given a specific pupil position. The image, which is a virtual image for the wearer of the spectacles 30, is of course not a real image on the projection area element 20; all that is perceived is a region on the projection area element 20 that is illuminated by the projector.

The measurement system 10 comprises two sidepiece holders 13, 15 for holding or supporting the sidepieces. The first sidepiece holder 13 has a first sidepiece carrier projection 14, by means of which the first spectacle sidepiece 32 can be moved outward, that is to say away from the second spectacle sidepiece 34. The second sidepiece holder 15 has a second sidepiece carrier projection 16, by means of which the second spectacle sidepiece 34 can be moved outward, that is to say away from the first spectacle sidepiece 32. The first sidepiece holder 13 has a fifth sidepiece holder projection 21, visible in FIG. 2, on which the first spectacle sidepiece 32 rests. The second sidepiece holder 15 has a sixth sidepiece holder projection (not shown), on which the second spectacle sidepiece 34 rests.

The first sidepiece holder 13 can be moved outward or inward (to the left or the right, respectively, in FIG. 1) by means of a first moving device 50. As a result, a force is exerted on the first spectacle sidepiece 32, or the first spectacle sidepiece 32 exerts a counter force against the first moving device 50. The first spectacle sidepiece 32 can as a result be curved, or the angle between the first spectacle sidepiece 32 and the first spectacle lens 36, or the projection area element 20, can be changed. By curving the first spectacle sidepiece 32, the position of the virtual image, or of the light beams forming the virtual image, on the projection area element 20 can be changed. Moreover, it is possible to study or examine how far the first spectacle sidepiece 32 must be moved in order to change the position of the virtual image, or of the light beams that generate the virtual image, on the projection area element 20 and how strong this change in the position of the virtual image or of the light beams that generate the virtual image is. The first moving device 50 may comprise a first force measurement system. The first force measurement system measures the force exerted by the first moving device 50 on the first spectacle sidepiece 32, or vice versa.

The same applies for the second sidepiece holder 15 as for the first sidepiece holder. The second sidepiece holder can be moved outward or inward (to the right or the left, respectively, in FIG. 1) by means of a second moving device 52. The measurement system 10 may comprise a second force measurement system which measures the force exerted by the second moving device 52 on the second spectacle sidepiece 34, or vice versa.

The first spectacle sidepiece 32 may be moved outward or inward symmetrically to the second spectacle sidepiece 34. However, it is possible to move the spectacle sidepieces 32, 34 outward or inward independently of one another, that is to say asymmetrically in relation to the nosepiece 40, or the first spectacle lens 36.

The two moving devices 50, 52 make it possible to adapt the spectacles 30 to the corresponding head width of the (potential) wearer. This means that the spectacle sidepieces 32, 34 are moved far enough apart so as to correspond to the head width of the wearer. It can then be checked whether the virtual image or the light beams that generate the virtual image is/are still incident on the pupil. If this is not the case, the position of the virtual image can be changed or corrected or adapted.

The projection area element 20 may be partially transparent in certain regions or over its entire surface area. This means that some of the light that is incident on or radiated onto the projection area element 20 from the first spectacle lens 36 passes through the projection area element 20. In this way, the region (eyebox) illuminated by the light rays 47 of the virtual image can be established reliably and precisely from behind, that is to say from a side of the projection area element 20 that faces away from the first spectacle lens 36. The projection area element 20 may comprise or be a diffusing plate.

The projection area element 20 may have a measuring scale on the front side, facing the first spectacle lens 36, and/or on the rear side, situated opposite the front side. The measuring scale may extend in two mutually perpendicular directions.

The projection area element 20 may be moved back and forth in the x direction (extending from left to right in FIG. 1). Moreover, the projection area element 20 may be moved back and forth in the y direction (extending from top to bottom in FIG. 1). The movement in the y direction makes it possible to modify or change the distance, or the smallest distance, between the projection area element 20 and the first spectacle lens 36, or between the projection area element 20 and the nosepiece 40 of the spectacles 30. The projection area element 20 may be moved by means of a projection area element moving device 25 in at least two mutually perpendicular directions. It is also possible to move the projection area element 20 in the z direction, which extends perpendicularly to the x direction and perpendicularly to the y direction.

The projection area element 20 may comprise or be a light sensor element. For example, the projection area element 20 may consist of multiple light sensors. It is conceivable that the projection area element 20 comprises or is a camera. The camera may for example be connected to a monitor and/or to a computer (not shown). The image detected by the camera can be presented on the monitor. It is conceivable that the computer analyzes the illuminated area on the projection area element 20 and correspondingly adapts the properties of the spectacles 30 in such a way that the virtual image in the pupil of the wearer of the spectacles 30 is completely visible when the wearer wears the spectacles 30 as intended. It is also conceivable that a camera films the projection area element 20 from the side facing toward and/or away from the first spectacle lens 36 and presents this on a monitor.

It is conceivable that the measurement system 10 is used to check the quality of a pair of spectacles 30 that is produced. This means that the measurement system 10 is used to check whether the eyebox of the virtual image is incident at a location or illuminates a location where the pupil of the wearer of the spectacles 30 is, with the result that the virtual image can be perceived completely and/or with sufficient brightness or light intensity when the wearer looks away from straight ahead and looks toward the first spectacle sidepiece 32 (as in the case illustrated). Ideally, the pupil is in the center of the region (eyebox) illuminated by the virtual image when the eye of the viewer turns toward the virtual image. In this position, the light of the virtual image is incident on the retina after passing through the pupil and crystalline lens, in order that the wearer of the spectacles 30 sees the virtual image completely and sharply. It is conceivable that, given the same spectacles 30 or the same spectacle frame combined with a constant size of the virtual image, a great or greater variance in the distance between the eyes can be compensated.

The wearer of the spectacles 30 may be an average human, that is to say no adaptation is made to the individual physical values of a certain human, and instead the spectacles 30 are adapted to the dimensions of a standard human or average human.

It is also conceivable that the measurement system 10 is used, for example in a specialist optician's shop, to adapt the spectacles 30 or the position of the eyebox of the virtual image to the individual properties or physical values of a certain human. In the process, it can be checked whether the corresponding spectacles 30 are suitable for this human owing to the human's dimensions, that is to say whether the eyebox or the virtual image is at the correct location. The dimensions of the human are, among other things, the position of the nose relative to the eyes and/or to the ears, the distance between the eyes or distance between the pupils.

The correct location is to be understood to mean that the wearer sees the virtual image completely and sharply and/or with sufficient brightness when they turn their eye correspondingly away from straight ahead and look toward the output coupling structure, that is to say toward the virtual image, with the result that the light beams that generate the virtual image are projected onto the retina along the orientation of output coupling structure, pupil and eye rotation point.

If the position of the virtual image is not sufficient or not optimum, the spectacles 30 can be correspondingly adapted. To that end, the spectacles 30 may have setting devices, by means of which the face form angle of the spectacles 30 (also referred to as angle of curvature; when a ruler is placed parallel to the nosepiece 40 of the spectacles 30, the face form angle is the angle formed by the spectacle lens 36, 38 with the ruler on each side), the distance between the spectacle lenses, and/or the pantoscopic angle of the spectacle lenses (that is to say, the angle in relation to a perpendicular axis) can be changed. The setting devices may for example be setting screws. The setting screws may for example be screws with an opposing thread on either side.

The measuring device may comprise a computer or a controller or the measuring device may be connected to a computer or to a controller.

The computer or the controller may detect and evaluate the position of the virtual image, or the eyebox of the virtual image that is projected onto the projection area element 20. The computer may compare the detected position with an intended position of the virtual image. The computer can then output the extent to which the intended position deviates from the detected position or whether this deviation is within predefined tolerance criteria.

The computer can actively change properties of the spectacles 30 in order to change the position of the eyebox of the virtual image on the projection area element 20 or to approximate the intended position. To that end, the spectacle sidepieces 32, 34 may be moved outward or inward independently of one another by the computer using the first moving device 50 and/or the second moving device 52. It is also conceivable that a heating device is present, by means of which the spectacle sidepieces 32, 34 can be heated and permanently deformed. It is also conceivable that the setting devices of the spectacles 30 are controlled by the computer in order to change the face form angle, the distance between the spectacle lenses and/or the pantoscopic angle of the spectacle lenses. It is also possible to change the distance between the projection area element 20 and the first spectacle lens 36. This also makes it possible to examine various materials and/or shapes of the spectacles 30, in particular their stiffness or the change in position of the eyebox and thus of the virtual image when properties of the spectacles 30 are changed. It is also conceivable that properties of the projector 45 are changed by the setting device or by the computer.

In particular, it is also possible to examine the extent to which the position of the virtual image and/or also the shape of the illuminated region of the projection area element 20 changes between a state in which no forces act on the spectacles 30 and states in which forces act on the spectacles 30, in particular on the spectacle sidepieces 32, 34.

The computer can change the spectacles 30, or the properties of the spectacles 30, in such a way that the virtual image is arranged at a suitable position for the respective human, with the result that the human can perceive the virtual image completely and sharply and/or with sufficient brightness. This can be adapted either for an average human or individually for a certain human.

The nosepiece 40, that is to say the connecting element between the two spectacle lenses or between the two mount elements which hold the two spectacle lenses, may rest on a nosepiece holding device 12 or be retained in a nosepiece holding device 12. The nosepiece holding device 12 may be moved upward and downward (that is to say upward and downward in FIG. 2). In this way, the measurement system 10 can be adapted to the respective position of the nose relative to the ears and/or eyes of the potential user. The nosepiece holding device 12 comprises a nosepiece carrier 19, which connects the nosepiece holding device to the base plate 70.

Figure 3:
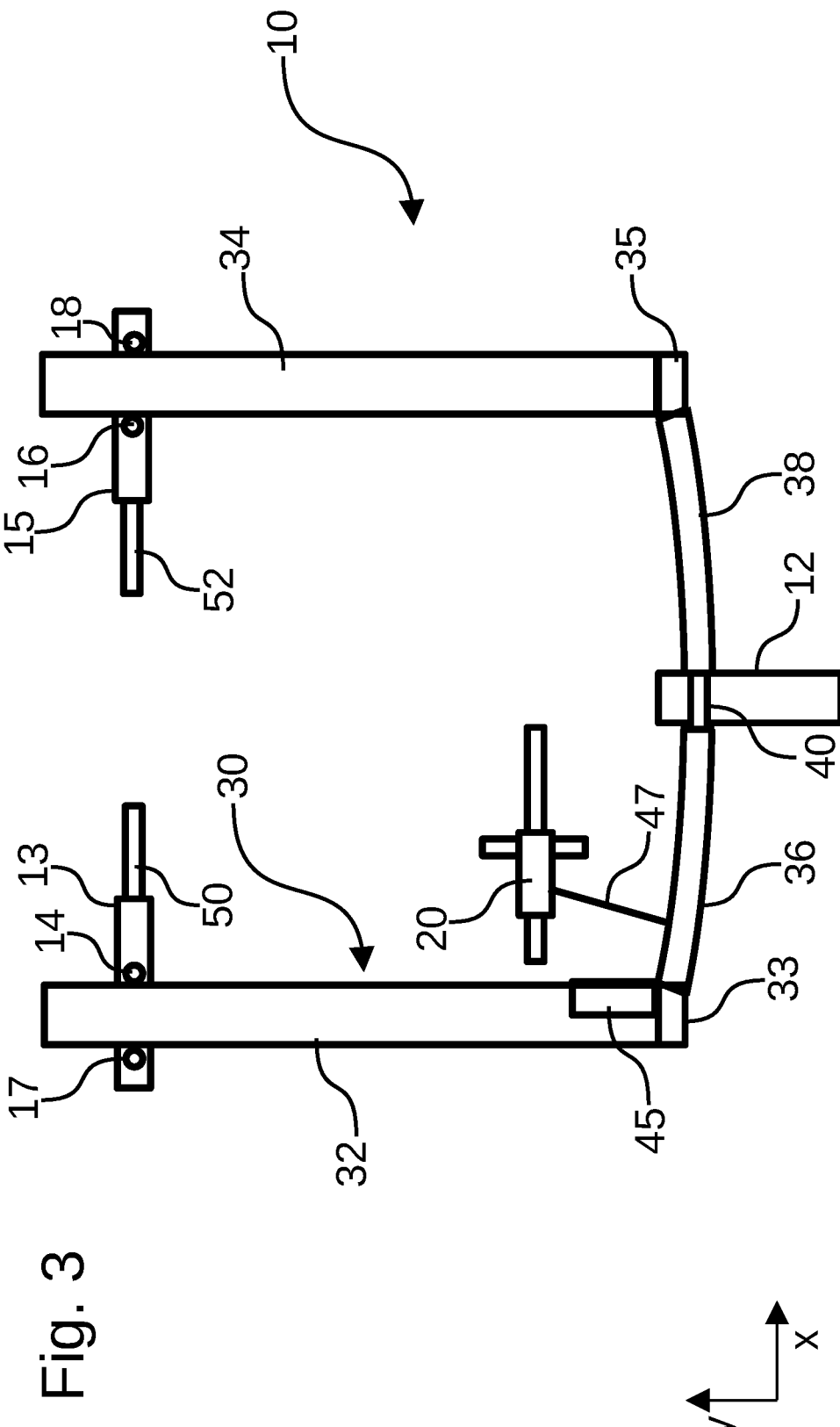
FIG. 3 shows a schematic plan view of a second embodiment of the measurement system in accordance with embodiments of the invention.

FIG. 3 shows a schematic plan view of a second embodiment of the measurement system 10. The second embodiment differs from the first embodiment in that the sidepiece holding device in the second embodiment retains the sidepiece on two opposite sides. The first sidepiece carrier 13 has a third sidepiece carrier projection 17 and the second sidepiece carrier 15 has a fourth sidepiece carrier projection 18. This makes it possible to move the first spectacle sidepiece 32 and/or the second spectacle sidepiece 34 outward and inward and the force exerted by the spectacle sidepiece 32, 34 on the respective moving device 50, 52 can be detected in technically straightforward fashion.

Figure 4:
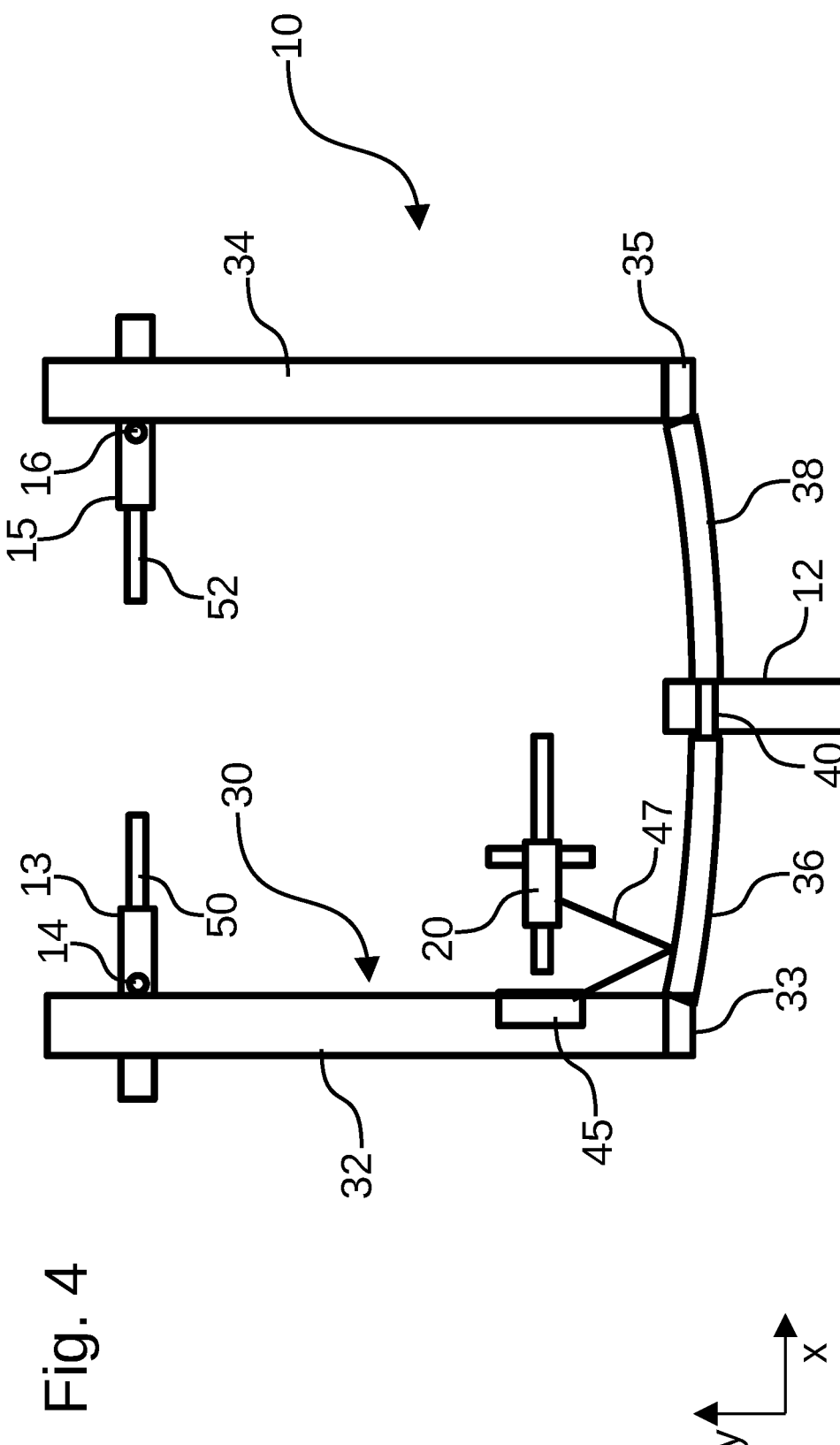
FIG. 4 shows a schematic plan view of a third embodiment of the measurement system in accordance with embodiments of the invention.

FIG. 4 shows a schematic plan view of a third embodiment of the measurement system 10. In the third embodiment, by contrast to the first embodiment, the projector 45 projects the image onto the rear side of the first spectacle lens 36, where it is partially or completely reflected and thus lands on the projection area element 20 or in the pupil of the wearer of the spectacles 30.

Figure 5:
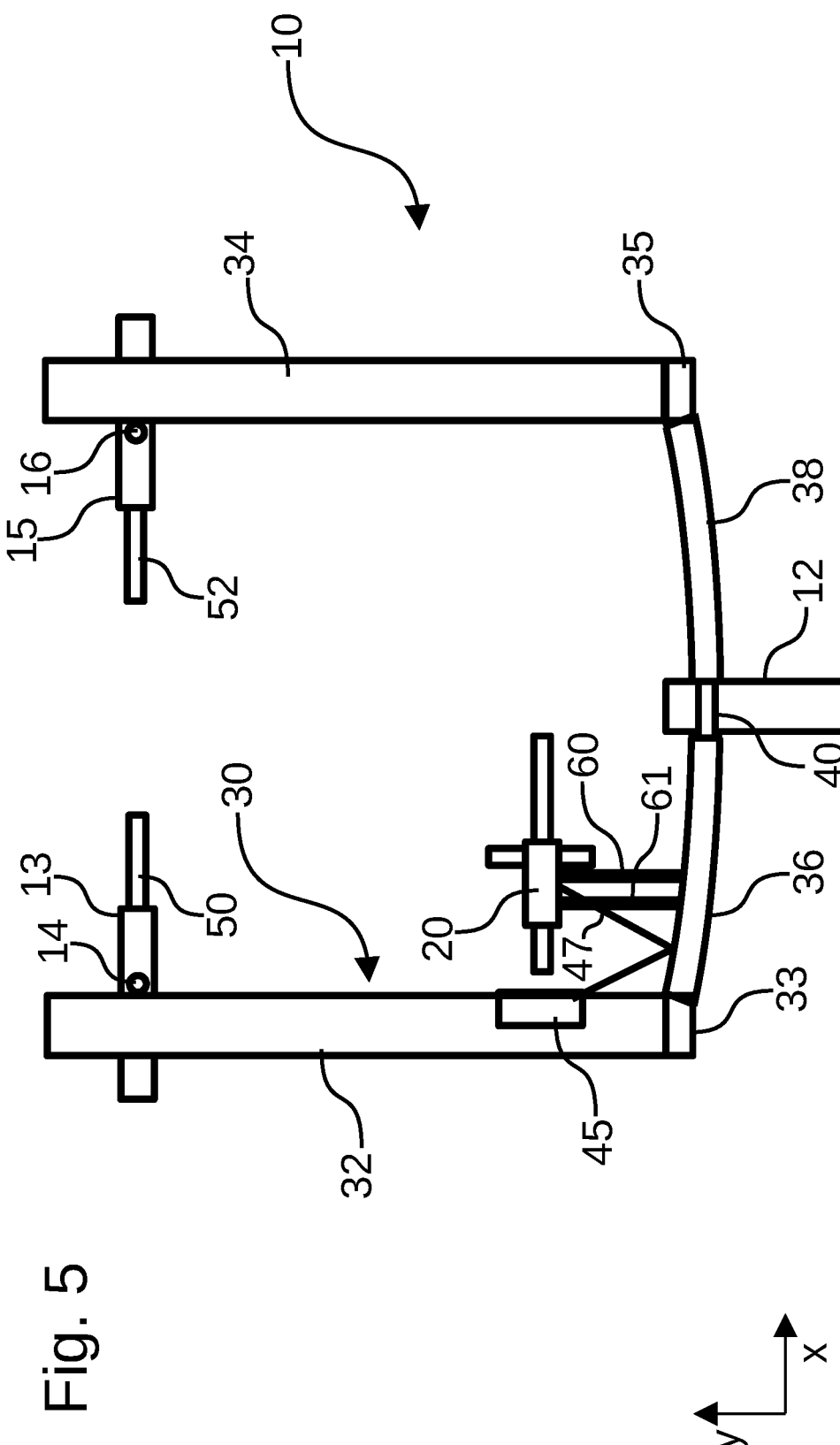
FIG. 5 shows a schematic plan view of a fourth embodiment of the measurement system in accordance with embodiments of the invention.

FIG. 5 shows a schematic plan view of a fourth embodiment of the measurement system 10. The measurement system 10 of the fourth embodiment differs from the measurement system 10 of the first embodiment in that the measurement system 10 of the fourth embodiment comprises a first distance measuring apparatus 60 and a second distance measuring apparatus 61. The distance measuring apparatuses 60, 61 extend parallel to one another and touch the first spectacle lens 36 at two mutually spaced apart points or regions. The distance measuring apparatuses 60, 61 may be rod-shaped elements. Each distance measuring apparatus 60, 61 is designed to measure the distance between the rear side of the first spectacle lens 36 and the projection area element 20. The distance measuring apparatuses 60, 61 are spaced apart from one another such that the angular position of the first spectacle lens 36 can be detected by means of the two distance measuring apparatuses 60, 61. It is also conceivable that the angular position of the first spectacle lens 36 is actively changed by means of the distance measuring apparatuses 60, 61. A permanent change to the angular position of the first spectacle lens 36 is also conceivable. If the two distance measuring apparatuses 60, 61 are supplemented by a 3rd, or a 3rd and a 4th, distance measuring apparatus, it is possible, depending on the arrangement of the measurement positions, to determine further lens parameters, such as the curvature of the lens in a section, the lens alignment and/or the radius of the rear-side curvature. It is also conceivable that a single value or a single property or some of these values or properties or all of these values or properties are (permanently) changed in order to change the position of the eyebox.

By means of each of the embodiments, it is possible to adapt the spectacles 30 individually to the user or human. The adaptation aims to make it possible for the user to see the virtual image completely and sharply (and optionally with sufficient brightness) when they wear the spectacles 30. The beams from the projector 45 should be incident on the pupils or a certain region thereof and the virtual image should be sharp to the user.

First of all, the head of the user can be measured. To that end, it is possible to measure the distance between the eyes or distance between the pupils, the position of the nose in relation to the eyes/pupils and/or the ear or the ears and/or the width of the head (that is to say the extent of the head from one ear to the other).

After that, the spectacles 30 are arranged on the measuring apparatus in such a way that the spectacle sidepieces 32, 34 are held by the spectacle sidepiece holding device or the first sidepiece carrier 13 and the second sidepiece carrier 15. The nosepiece 40 can rest on the nosepiece holding device 12. The position of the nosepiece holding device 12 relative to the sidepiece carriers 13, 15 is set to the respective position of the nose of the user relative to the position of the eyes and/or ears of the user. Then, the distance between the projection area element 20, or that side of the projection area element 20 that faces the first spectacle lens 36, and the first spectacle lens is set to the distance between the pupils of the user and the first spectacle lens 36. Then, the eyebox of the virtual image can be projected onto the projection area element 20 by means of the first spectacle lens 36. As a result, it is possible to check the position of the eyebox of the virtual image on the pupil or the position of the pupil in that part of the projection area element 20 that is illuminated by the virtual image. Subsequently, or prior to this, it is possible to change the distance between the two spectacle sidepieces 32, 34 or the position of the two spectacle sidepieces 32, 34, that is to say the angle between the first spectacle sidepiece 32 and the first lens and/or the second lens and the angle between the second spectacle sidepiece 34 and the first lens and/or the second lens. In the process, it is possible to observe the position of the eyebox of the virtual image on the projection area element 20.

The position may for example be changed by modifying the pantoscopic angle of the spectacles 30, the face form angle of the first spectacle lens 36 and/or of a second spectacle lens 38 of the spectacles 30 and/or the angle between the first spectacle sidepiece 32 and the first spectacle lens 36 and/or the angle between the second spectacle sidepiece 34 and the first spectacle lens 36 and/or a distance between the first spectacle lens 36 and the second spectacle lens 38. Each of these variables makes it possible to change the position of the eyebox of the virtual image on the projection area element 20 and thus to adapt it to the pupil position of the wearer. The position of the eyebox of the virtual image is then set in such a way that the virtual image can be seen by the wearer completely and sharply and/or with sufficient brightness. To that end, it is necessary to use the light beams that generate the virtual image to illuminate that region of the projection area element 20 where the pupil of the wearer is later on when looking toward the virtual image or toward the output coupling structure.

In the case of this adaptation, it is conceivable that the spectacles 30 have a corresponding setting device (for example adjusting screws) for changing the pantoscopic angle of the spectacles 30, the face form angle of the first spectacle lens 36 and/or of a second spectacle lens 38 of the spectacles 30, the angle between the first spectacle sidepiece 32 and the first spectacle lens 36 and/or the angle between the second spectacle sidepiece 34 and the first spectacle lens 36 and/or a distance between the first spectacle lens 36 and the second spectacle lens 38. These setting devices may be controlled or changed by the computer or by the controller.

It is also conceivable that the properties of the spectacles 30 are at least partially permanently changed. For example, it is conceivable to heat the spectacle sidepieces 32, 34 and permanently change their shape (that is to say, until they are reheated).

It is also conceivable for the radiation direction of the light beams from the projector 45 to be controlled by means of hardware and/or software in order to change the position of the eyebox of the virtual image relative to the first spectacle lens 36 or relative to the projector 45.

The measurement system 10 may also be designed to measure the positions of two virtual images. For example, it is conceivable to arrange a projector 45 both in the first spectacle sidepiece 32 and in the second spectacle sidepiece 34, with the result that the user can see a virtual image through the first spectacle lens 36 and/or through the second spectacle lens 38.

The measurement system 10 may have elements, which are complementary or similar to the elements present in the embodiments shown, for measuring the eyebox, projected by the second projector in the second spectacle sidepiece 34, of the virtual image onto the other pupil.

It is possible for the light intensity on the projection area element 20 and/or the distribution of the light intensity on the projection area element to be detected in addition or alternatively to the position of the eyebox. This can be detected for example by means of multiple light sensors and/or by means of a camera. The light intensity may be evaluated and/or graphically presented by means of a computer or software.

A measurement system 10 described above having a pair of spectacles 30 held by the holding device is also disclosed. The use of the measurement system 10 for measuring a pair of spectacles is also disclosed.

LIST OF REFERENCE SIGNS

10 Measurement system
12 Nosepiece holding device
13 First sidepiece carrier
14 First sidepiece carrier projection
15 Second sidepiece carrier
16 Second sidepiece carrier projection
17 Third sidepiece carrier projection

18 Fourth sidepiece carrier projection
19 Nosepiece carrier
20 Projection area element
21 Fifth sidepiece holder projection
25 Projection area element moving device
30 Spectacles
32 First spectacle sidepiece
33 First spectacle hinge
34 Second spectacle sidepiece
35 Second spectacle hinge
36 First spectacle lens
38 Second spectacle lens
40 Nosepiece
45 Projector
47 Light beams
50 First moving device
52 Second moving device
60 First distance measuring apparatus
61 Second distance measuring apparatus
70 Base plate

What is claimed is:

1. A measurement system for measuring a position of an eyebox of a virtual image for a pair of spectacles that can be worn on the head of a user, the pair of spectacles comprising a first spectacle lens and a projector for generating the virtual image, which can be projected through a pupil onto a retina of a user via the first spectacle lens when the user wears the pair of spectacles on their head, the measurement system comprising:

a holding device to hold the spectacles at a predefined position;

a projection area element, onto which light beams that generate the virtual image can be projected via the first spectacle lens when the pair of spectacles is held by the holding device, wherein the projection area element is arranged at such a position in relation to the first spectacle lens, when the spectacles are held by the holding device, that a position of the projection area element at least partially corresponds to a position of a pupil of the user when the user wears the pair of spectacles on their head.

2. The measurement system of claim 1, wherein the holding device comprises a spectacle sidepiece holding device to hold a first spectacle sidepiece and/or a second spectacle sidepiece of the spectacles at a predefined position.

3. The measurement system of claim 1, further comprising a nosepiece holding device to hold a nosepiece of the pair of spectacles at a predefined position.

4. The measurement system of claim 1, further comprising a first moving device to change an angle between a first spectacle sidepiece of the pair of spectacles and the first spectacle lens.

5. The measurement system of claim 4, further comprising a second moving device to change an angle between a second spectacle sidepiece of the pair of spectacles and the first spectacle lens.

6. The measurement system of claim 5, wherein the first moving device and the second moving device are each configured such that the angle between the first spectacle sidepiece and the first spectacle lens can be changed independently of the angle between the second spectacle sidepiece and the first spectacle lens.

7. The measurement system of claim 5, wherein the first moving device and/or the second moving device comprises a force measurement system to measure a force exerted by the first spectacle sidepiece or the second spectacle sidepiece on the first moving device or the second moving device, respectively.

8. The measurement system of claim 1, wherein the measurement system is configured to detect an intensity distribution and/or an irradiance and/or an illuminance of the light beams that generate the virtual image, and/or to detect the intensity distribution, the irradiance and/or the illuminance on the projection area element.

9. The measurement system of claim 1, wherein the projection area element is at least partially transparent.

10. The measurement system of claim 1, wherein the projection area element comprises a light sensor.

11. The measurement system of claim 1, wherein the measurement system is configured such that a distance between the projection area element and the first spectacle lens, when the pair of spectacles is held by the holding device, can be changed such that the distance between the projection area element and the first spectacle lens can be set to a predefined value.

12. The measurement system of claim 1, wherein the measurement system further comprises an angle measuring apparatus to detect a face form angle of the first spectacle lens.

13. The measurement system of claim 1, wherein the measurement system comprises a setting device, the setting device being configured to:

detect a position of the eyebox of the virtual image on the projection area element, compare the detected position of the eyebox of the virtual image on the projection area element with an intended position, and change:

a face form angle of the first spectacle lens and/or of a second spectacle lens of the spectacles, and/or a pantoscopic angle of the first spectacle lens relative to the projector, and/or an angle between the first spectacle sidepiece and the first spectacle lens and/or an angle between the second spectacle sidepiece and the first and/or second spectacle lens, and/or a distance between the first spectacle lens and the second spectacle lens.

14. A method for measuring a position of an eyebox of a virtual image of a pair of spectacles with a first spectacle lens that can be worn on the head of a user, the method comprising:

providing the pair of spectacles to a user;

arranging a projection area element on a first side of the first spectacle lens, the projection area element having a first predefined distance from the first side of the first spectacle lens, the projection area element being arranged at a position in relation to the first spectacle lens that at least partially corresponds to the position of a pupil of the user when the user wears the spectacles on their head;

projecting light beams to generate the virtual image onto the projection area element via the first spectacle lens; and detecting a position of the eyebox of the virtual image on the projection area element.

15. The method of claim 14, further comprising comparing the detected position with an intended position of the eyebox of the virtual image on the projection area element.

16. The method of claim 14, wherein the pair of spectacles comprises a second spectacle lens, and wherein the method further comprises changing a face form angle of the first spectacle lens and/or of the second spectacle lens in order to change the position of the eyebox of the virtual image on the projection area element.

17. The method of claim 14, further comprising changing a pantoscopic angle of the first spectacle lens relative to a projector that generates the virtual image and/or relative to a first spectacle sidepiece of the pair of spectacles in order to change the position of the eyebox of the virtual image on the projection area element.

18. The method of claim 14, further comprising changing a force exerted by a first spectacle sidepiece and/or by a second spectacle sidepiece of the pair of spectacles on a first moving device to change an angle between the first spectacle sidepiece and the first spectacle lens or on a second moving device to change the angle between the second spectacle sidepiece and the first spectacle lens being detected.

19. The method of claim 14, further comprising changing an intensity distribution and/or an irradiance and/or an illuminance of the light beams that generate the virtual image.

20. The method of claim 14, further comprising changing an intensity distribution and/or an irradiance and/or an illuminance on the projection area element being detected.

\* \* \* \* \*